United States Patent [19]

Hallqvist

[11] 4,302,144
[45] Nov. 24, 1981

[54] WORK CHANGING MECHANISM FOR MACHINE TOOLS

[75] Inventor: Ellert Hallqvist, Vesteras, Sweden

[73] Assignee: MT Machine Company AB, Sweden

[21] Appl. No.: 90,961

[22] Filed: Nov. 5, 1979

[30] Foreign Application Priority Data

Nov. 13, 1978 [SE] Sweden ............................. 7811714

[51] Int. Cl.³ ............................................. B23Q 7/04
[52] U.S. Cl. .................................... 414/590; 29/568; 82/2.5; 414/225; 414/739; 414/753
[58] Field of Search ................... 29/568; 414/225, 590, 414/623, 736, 751, 753, 735, 730; 82/2.5

[56] References Cited

U.S. PATENT DOCUMENTS

| | | | |
|---|---|---|---|
| 2,040,028 | 5/1936 | Smith | 82/2.5 |
| 3,575,302 | 4/1971 | Cafolla | 414/736 X |
| 3,658,190 | 4/1972 | Fournier | 414/753 X |
| 3,895,424 | 7/1975 | Hautau | 82/2.5 X |
| 4,013,176 | 3/1977 | Lohneis et al. | 414/730 |
| 4,082,018 | 4/1978 | Russell | 82/2.5 |
| 4,165,808 | 8/1979 | Stumpf | 414/736 |
| 4,187,749 | 2/1980 | Webber | 414/751 X |

FOREIGN PATENT DOCUMENTS 1110496 6/1961 Fed. Rep. of Germany.
2744933 4/1979 Fed. Rep. of Germany ...... 414/590

Primary Examiner—Galen L. Barefoot
Assistant Examiner—Terrance L. Siemens
Attorney, Agent, or Firm—Karl W. Flocks

[57] ABSTRACT

A work changing mechanism for machine tools, especially lathes, designed for automatic change of works to be clamped by centers or chucks comprising a shuttle car movable in the direction of the spindle axis of the lathe, a slide vertically movable along the shuttle car and rotatably arranged on the slide and about a horizontal shaft extending transversely to the spindle axis is a gripping mechanism including two pairs of jaws which are horizontally displaceable parallel to the shaft on opposite sides thereof. The first jaw pair is adapted to feed work into the machine tool and the second pair to remove machined work from the machine tool. Loading and removing work pieces may be rapidly achieved because the work changing mechanism is controlled by computer.

3 Claims, 4 Drawing Figures

WORK CHANGING MECHANISM FOR MACHINE TOOLS

This invention relates to a work changing mechanism for machine tools, such as lathes, mill cutters and the like, said work changing mechanism being designed for automatic change of works to be clamped by centres or chucks.

By use of a work changing mechanism in a program-controlled machine tool, e.g. a numerically controlled lathe, it is possible automatically to collect a finished workpiece from the machine and insert a new blank.

Prior art mechanisms are generally intended to handle workpieces in large quantities, for use in e.g. the motor industry. These mechanisms have low flexibility and involve long resetting time. The distances of travel are programmed with movable cams the adjustment of which takes a long time and which restricts the movement pattern.

The object of the present invention is to provide a work changing mechanism which permits very rapid reequipping due to the absence of cams and also due to the design and movement pattern of the gripping means.

Another object of the present invention is to provide a work changing mechanism in which the numerical control is of simple and reliable construction and function.

These objects are achieved with the mechanism according to the invention which comprises a shuttle car movable in the longitudinal direction of the machine tool, a slide vertically movable along the shuttle car and, arranged on the slide and rotatable about a horizontal shaft, a gripping means on which a first and a second pair of jaws are horizontally displaceable in parallel with said shaft on opposite sides thereof.

The invention will be described in more detail hereinafter with reference to the accompanying drawings which show preferred embodiments and in which.

Figure 1:
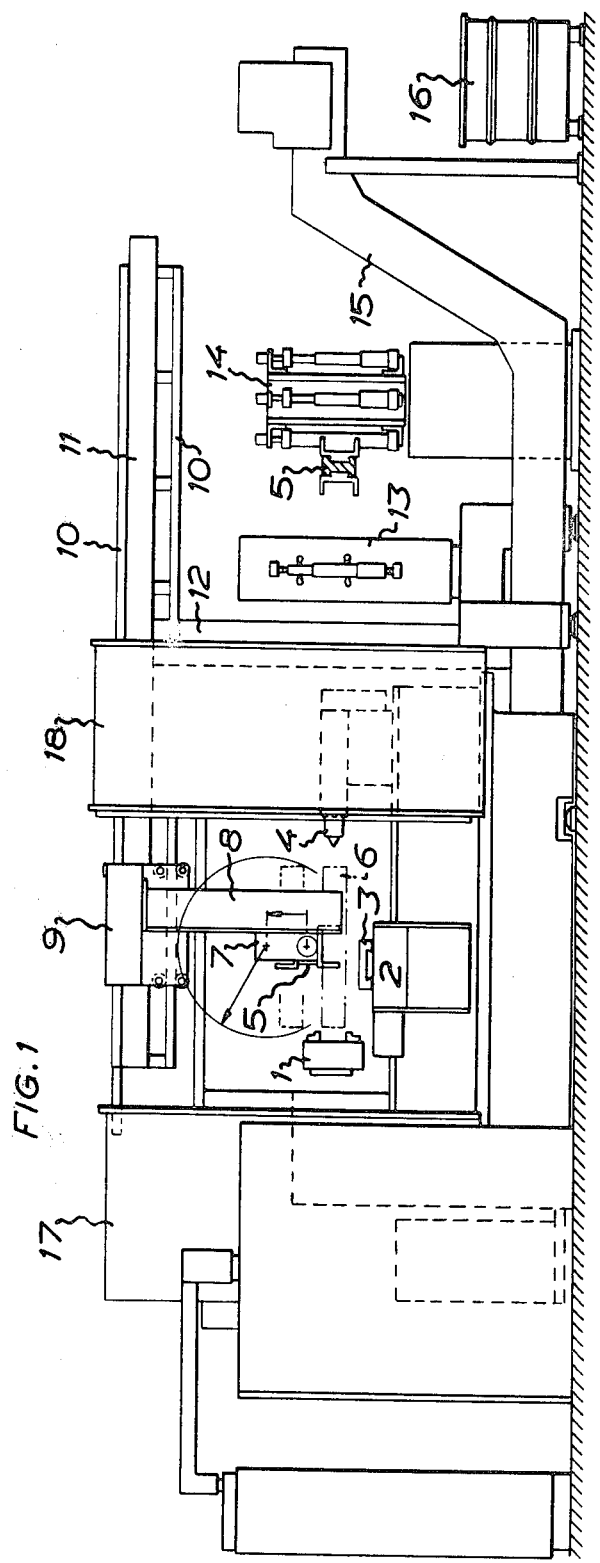
FIG. 1 is a side elevation of a numerically controlled lathe including a first embodiment of a work changing mechanism for works to be clamped by centres.
Figure 2:
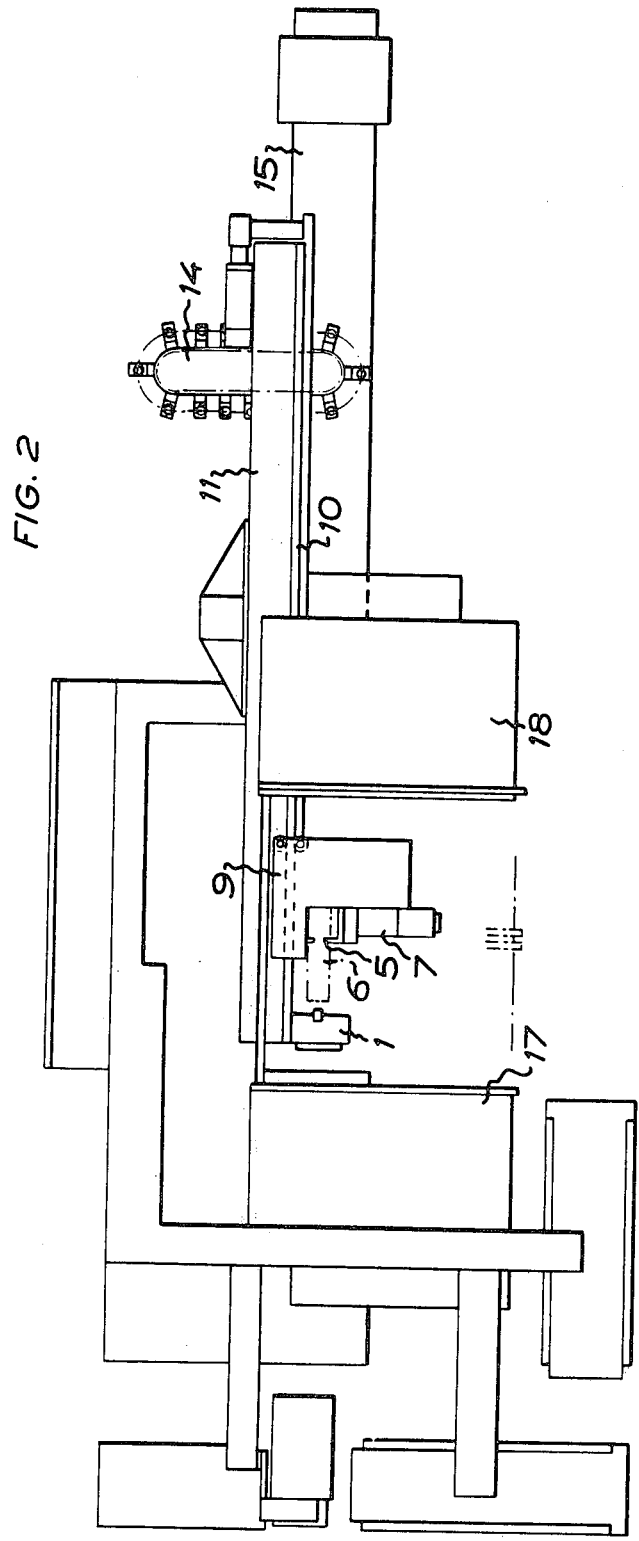
FIG. 2 is a plan view of the lathe of FIG. 1.

A machine tool, e.g. a numerically controlled lathe, including a work changing mechanism according to the invention and a work magazine, is shown in FIGS. 1 and 2, wherein 1 designates the chuck of the machine, 2 the carriage thereof, 3 a tool-holding cross-slide, and 4 the tailstock thereof. The work changing mechanism comprises a double-sided, indexable gripping means 5 adapted to grip a workpiece 6, a vertically movable slide 7 and a shuttle car 9 provided with a downwardly directed arm 8. The shuttle car 9 is guided on rails 10 which are attached to a beam. This beam 11 is mounted on a column 12. A measuring station 13 is provided between the work magazine 14 and the chuck 1, to which the work changing mechanism can carry the finished work for check measuring. The work magazine 14 is equipped to receive and release workpieces to be held by headstock and/or tailstock members but it can be re-equipped to be able also to receive and release chuck workpieces. A cuttings conveyor 15 is adapted to deliver the detached cuttings into a container 16. The working space of the machine is surrounded by two mobile protecting means 17 and 18 which in FIGS. 1 and 2 are shown spaced apart.

Figure 3:
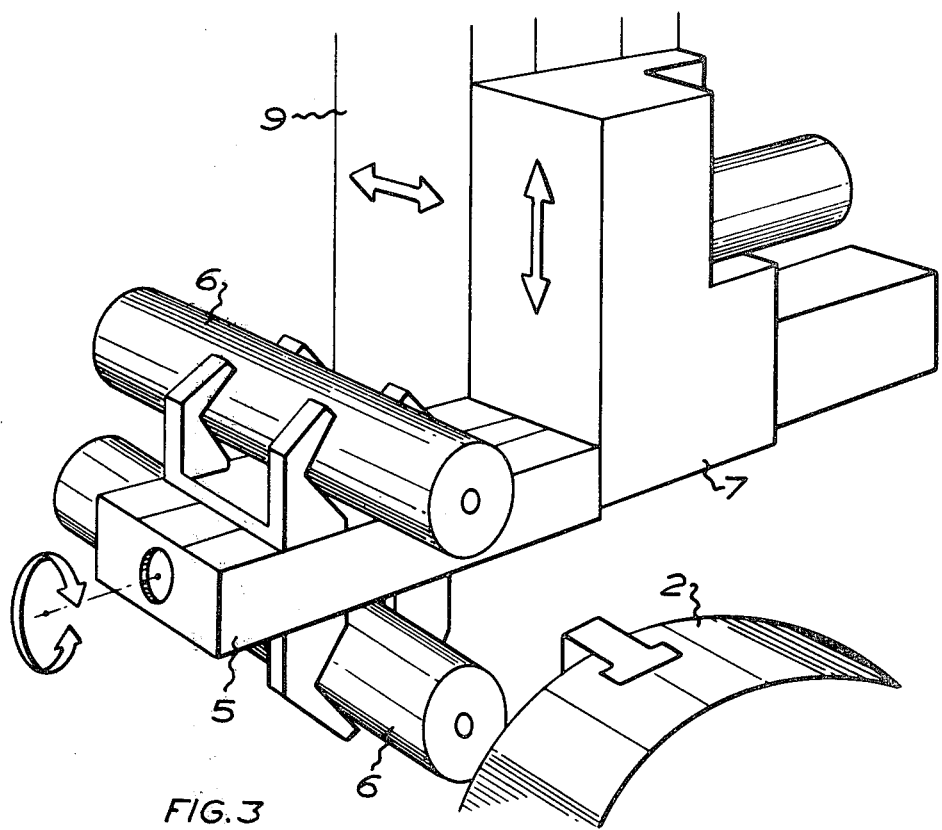
FIG. 3 is a partial perspective view of the work changing mechanism of FIGS. 1 and 2.
Figure 4:
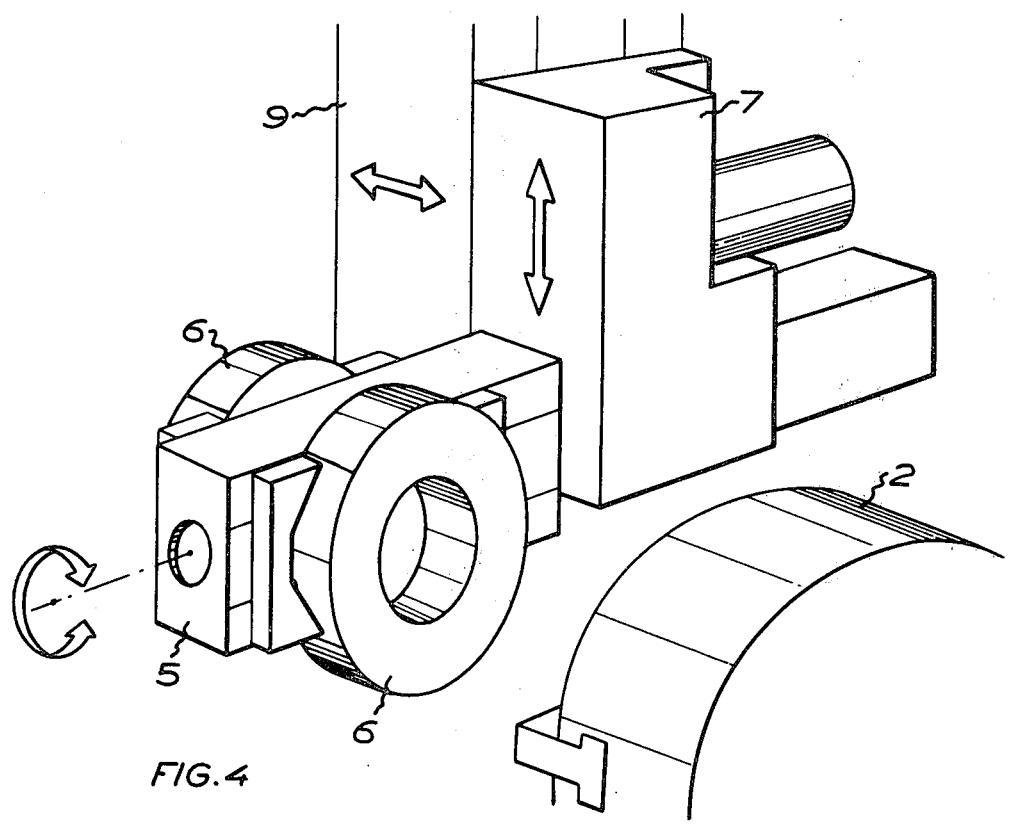
FIG. 4 is a partial perspective view of a second embodiment of a work changing mechanism for works to be clamped by chucks according to the invention.

A more detailed description of the work changing mechanism according to the invention will now be given with reference to FIGS. 3 and 4.

A crane with the horizontal beam 11 is arranged in parallel relationship with the centre line of the spindle and mounted on column 12 which is situated adjacent one end of the machine and is spaced above the tool location.

The shuttle car 9 is adapted to run on the rectilinear guides or rails 10 of the beam. It is driven by a d.c. servo motor and by means of a connected pulse generator the car can be numerically controlled with a programmable precision of e.g. 1 mm. The shuttle car is provided with the downwardly directed arm 8 which is provided with rectilinear guides for the vertical slide 7. This slide can be vertically positioned by means of a feed system like that of the shuttle car. On the vertical slide the gripping means 5 is rotatably mounted on an indexable horizontal shaft extending transversely of the machine tool spindle axis. The gripping means consists in principle of two 2-jaw chucks the jaws or fingers (FIG. 3) of which are exchangeable for adjustable V-blocks on base jaws (FIG. 4). They can be clamped on outside as well as internal diameters. The two 2-jaw chucks are built in on either side of the indexable shaft. This can be located in four different angular positions (0°–90°–180°–270°). The rotation as well as the operation of the 2-jaw chucks takes place hydraulically.

The mechanism consequently has five degrees of freedom, viz.

two for the finger movements of the double-sided gripping means,
one for the rotation (4 index positions) of the gripping means about the horizontal shaft thereof,
one for raising and lowering the gripping means along the vertical rectilinear guide on the downwardly directed arm of the shuttle car, and
one for the horizontal movement of the shuttle car in the longitudinal direction of the machine.

The two last-mentioned degrees of freedom are preferably numerically controlled.

The work changing mechanism according to the invention is preferably computer controlled. Due to this and due to its movement pattern the work changing mechanism is most flexible. Thus it can be used for workpieces to be assembled on headstock and/or tailstock members as well as chucks without any adjustment except for the exchange of jaws in the gripping means. For different types of collecting positions, i.e. more exactly, the disclosed work changing mechanism may be either a conveyor belt with pallets have the axis of rotation of the workpiece extend vertically or horizontally, a chain magazine, turret magazine, an inclined chute or a roller table, for complete machining of works with two fixations in sequence in the same machine, for different lathes or mill cutters, said mechanism being adjustable for variations as to the size of workpieces and machine, and for manual loading.

Throughout the changing sequence of the disclosed invention a workpiece may be processed with its axis of rotation situated in the vertical plane of the machine spindle where thus also the collecting and releasing station, and maybe also an intermediate station and/or a measuring station, are situated. In the vertical sense, however, these stations may be disposed freely within the range of movement of the vertical slide.

The two finger pairs of the gripping means are designed one to feed in a blank and the other to withdraw or remove a machined detail. The change takes place by indexing the shaft of the gripping means 180°. This indexing operation is preceded by a horizontal withdrawing movement out of the chuck jaws, i.e. a removal of the workpiece from the chuck, and possibly a movement of the vertical slide. The latter movement is applicable to short workpieces for centres where the tailstock spindle movement may be insufficient to uncover the turning area of the workpiece. It is presupposed that the turning area is free.

If the cross slide 3 or some other part of the machine is placed immediately below or above the working area of the machine, so that the turning area is not free, then the vertical slide must be displaced respectively upwardly or downwardly to carry out the indexing operation mentioned above.

When a workpiece is to be withdrawn the vertical movement is used to allow passing a tailstock and a tool turret. The vertical movement is also used for locating the gripping fingers in the collecting and releasing positions. Due to the NC-system the movement pattern in these operations may be complicated and still admit a simple program.

If the workpiece is to be completely machined by double fixations in one and the same machine an intermediate station is mounted between the machine and respectively the collecting and releasing positions. As far as centre workpieces are concerned this intermediate station may consist of a simple bushing.

If the detail is to be completely machined in two linked machines, it is possible to dispense with a separate turning station in the conveyor path between the machines by using—when it is a question of centre workpieces—the intermediate station in machine no. 1.

In the intermediate station the workpieces are vertically postiioned in e.g. bushings on the conveyor pallet. In case of chuck workpieces use is made of the intermediate station in machine no. 1.

The invention is of course not limited to the embodiments described above but may be modified within the scope of the appendant claims.

What I claim and desire to secure by Letters Patent is:

1. A work changing mechanism for machine tools, designed for automatic change of work pieces to be clamped therein, comprising a shuttle car (9) movable in the direction of the machine tool spindle axis, a slide (7) vertically movable along the shuttle car and, gripping means (5) mounted on the slide in rotatable relationship about a horizontal shaft extending transversely to the machine tool spindle axis, said gripping means (5) including a first and second pair of jaws which are horizontally displaceable parallel to said shaft on opposite sides thereof, means for selectively moving each jaw of said pairs of jaws toward and away from the jaw forming one of said pairs, said first pair of jaws being adapted to feed a work piece into the machine tool to be clamped therein for a machine operation and the second pair to withdraw a machined work piece from the machine tool.

2. A work changing mechanism as claimed in claim 1, wherein the first and second jaw pairs are removable and are replaceable by jaw pairs of different design, said first jaw pair being adapted to the form of a blank to be machined and said second jaw pair being adapted to the form of a machined detail.

3. A work changing mechanism as claimed in claim 1 or 2, wherein the gripping means (5), which is rotatable about said horizontal shaft, is adapted to be situated in four angular positions making right angles to each other.

* * * * *

UNITED STATES PATENT AND TRADEMARK OFFICE
CERTIFICATE OF CORRECTION

PATENT NO. : 4,302,144
DATED : November 24, 1981
INVENTOR(S) : HALLQVIST, Ellert It is certified that error appears in the above—identified patent and that said Letters Patent is hereby corrected as shown below:

On the Title page Item [73] Assignee should read:

--SMT Machine Company AB--.

Signed and Sealed this

Fifteenth Day of June 1982

[SEAL]

Attest:

GERALD J. MOSSINGHOFF

Attesting Officer  Commissioner of Patents and Trademarks